United States Patent
Griffin et al.

[11] Patent Number: 6,026,655
[45] Date of Patent: Feb. 22, 2000

[54] LIQUID ACCUMULATOR WITH INLET TUBE

[75] Inventors: Gary E. Griffin, Penn Yan; Robert F. Prayne, Seneca Falls, both of N.Y.

[73] Assignee: Parker-Hannifin Corporation, Cleveland, Ohio

[21] Appl. No.: 09/005,909

[22] Filed: Jan. 12, 1998

Related U.S. Application Data

[60] Provisional application No. 60/039,189, Feb. 27, 1997.

[51] Int. Cl.<sup>7</sup> ............................. F25B 43/00; B01D 45/12
[52] U.S. Cl. ............................. 62/503; 55/459.4; 95/271; 96/211
[58] Field of Search ..................... 62/503, 509; 95/271; 55/459.4; 96/209, 211

[56] References Cited

U.S. PATENT DOCUMENTS

| | | | |
|---|---|---|---|
| 928,546 | 7/1909 | Schneible | 96/211 |
| 2,787,135 | 4/1957 | Smith | 62/503 |
| 3,411,319 | 11/1968 | Thompson et al. | 62/503 |
| 3,488,678 | 1/1970 | Wagner | 62/503 |
| 3,643,465 | 2/1972 | Bottum | 62/503 |
| 3,754,409 | 8/1973 | Wreen, Jr., et al. | 62/503 |
| 3,938,353 | 2/1976 | Wrenn, Jr. et al. | 62/503 |
| 4,215,555 | 8/1980 | Cann et al. | 62/324 |
| 4,458,505 | 7/1984 | Griffin | 62/503 |
| 4,573,327 | 3/1986 | Cochran | 62/238.6 |
| 4,583,377 | 4/1986 | Viegas | 62/503 |
| 4,627,247 | 12/1986 | Morse | 62/503 |
| 4,651,540 | 3/1987 | Morse | 62/503 |
| 4,653,282 | 3/1987 | Gueneau | 62/79 |
| 5,076,071 | 12/1991 | Morse | 62/503 |
| 5,179,844 | 1/1993 | Lyman et al. | 62/503 |
| 5,233,842 | 8/1993 | Manning et al. | 62/472 X |
| 5,282,370 | 2/1994 | Kiblawi et al. | 62/503 |
| 5,347,817 | 9/1994 | Kim | 62/471 |
| 5,365,751 | 11/1994 | Mikesell et al. | 62/298 |
| 5,419,157 | 5/1995 | Kiblawi et al. | 62/503 |
| 5,531,080 | 7/1996 | Hirahara et al. | 62/470 |
| 5,551,255 | 9/1996 | Rothfleisch | 62/502 |
| 5,787,728 | 8/1998 | Das et al. | 62/503 |

*Primary Examiner*—William Wayner
*Attorney, Agent, or Firm*—Christopher H. Hunter

[57] ABSTRACT

An accumulator for a refrigeration system includes a housing having a cylindrical sidewall and upper and lower end walls. Inlet and outlet tubes are provided in the housing for directing refrigerant into and out of the accumulator. The inlet tube includes a first end fluidly connected to an inlet fitting at the upper end wall of the housing, and a second end located proximate the lower end wall of the housing. A longitudinal orifice is provided along the entire length of the inlet tube, from a location above the level of stored liquid refrigerant in the accumulator, to a location below the level of stored liquid. The orifice is oriented to direct fluid tangentially along the inside surface of the side wall. The inlet tube is formed by a strip of material where the side edges of the strip are brought together to define the opening, or the side edges can be brought into contact along a seam and a plurality of openings can be provided along the tube. The inlet tube can also comprise a strip of material which cooperates with the inside surface of the sidewall to form a flow path from the inlet fitting into the housing. In this case, both side edges of the inlet tube can be located against the inside surface of the sidewall. A series of fluid openings are formed along one side edge to direct fluid tangentially along the inside surface of the sidewall. Alternatively, one side edge can be spaced apart from the sidewall to define the longitudinal opening. In any case, the lower end of the inlet tube can be spaced from the lower end wall of the accumulator and can include an end cap or can be in contact with the lower end wall.

36 Claims, 3 Drawing Sheets

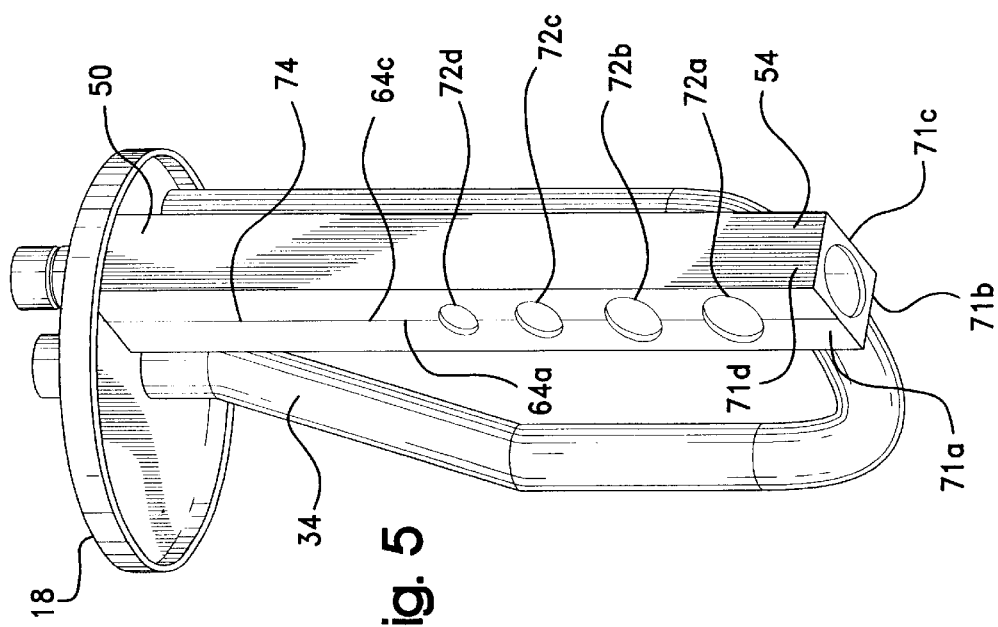
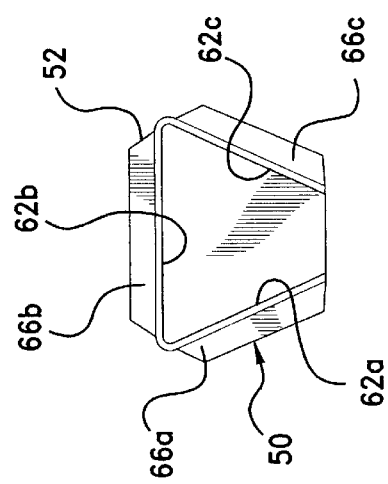
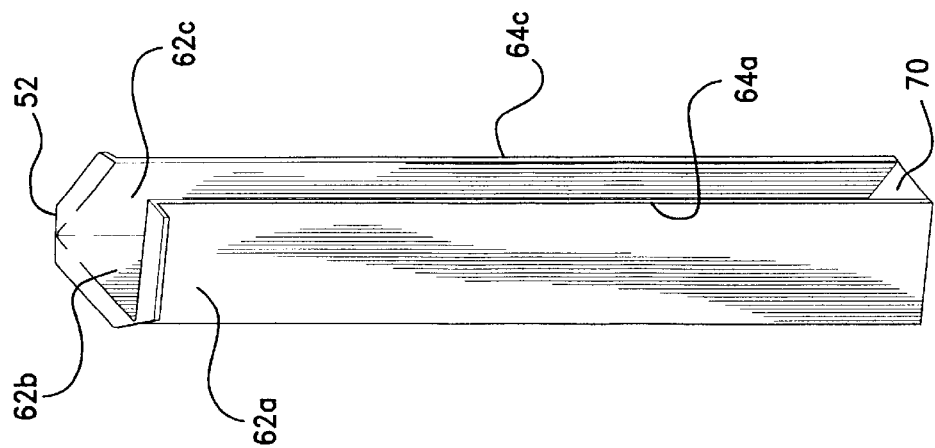

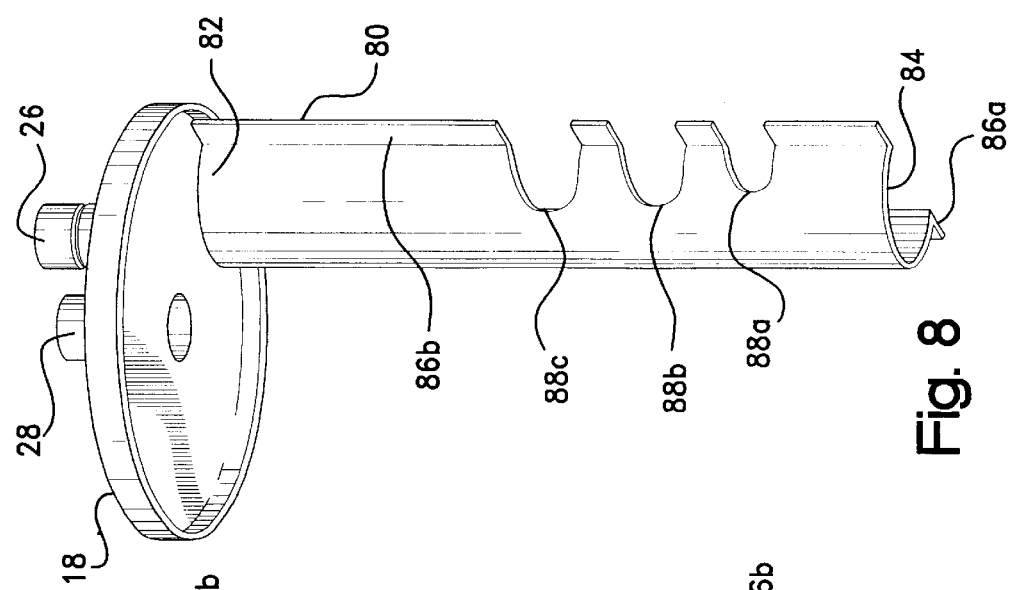
Fig. 8
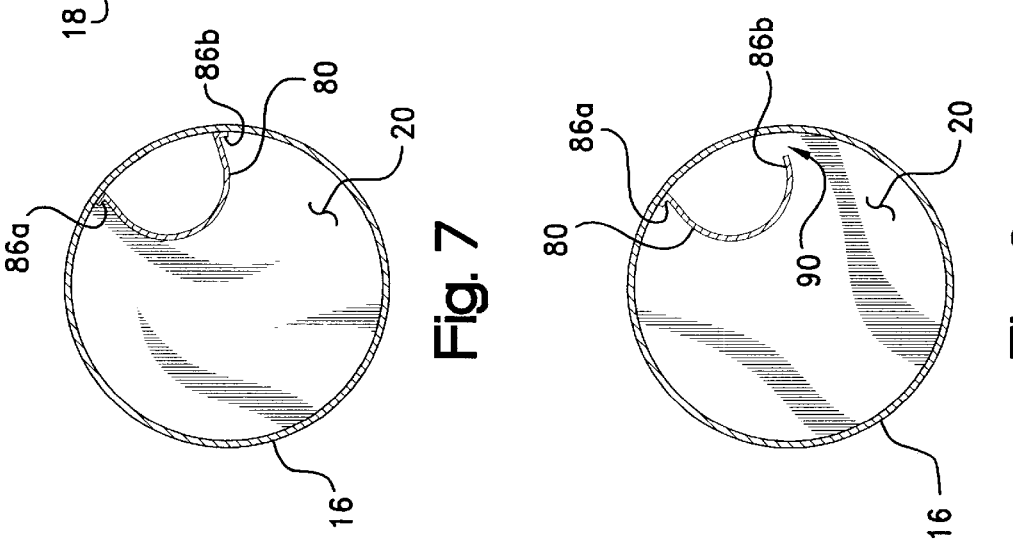
Fig. 7
Fig. 9
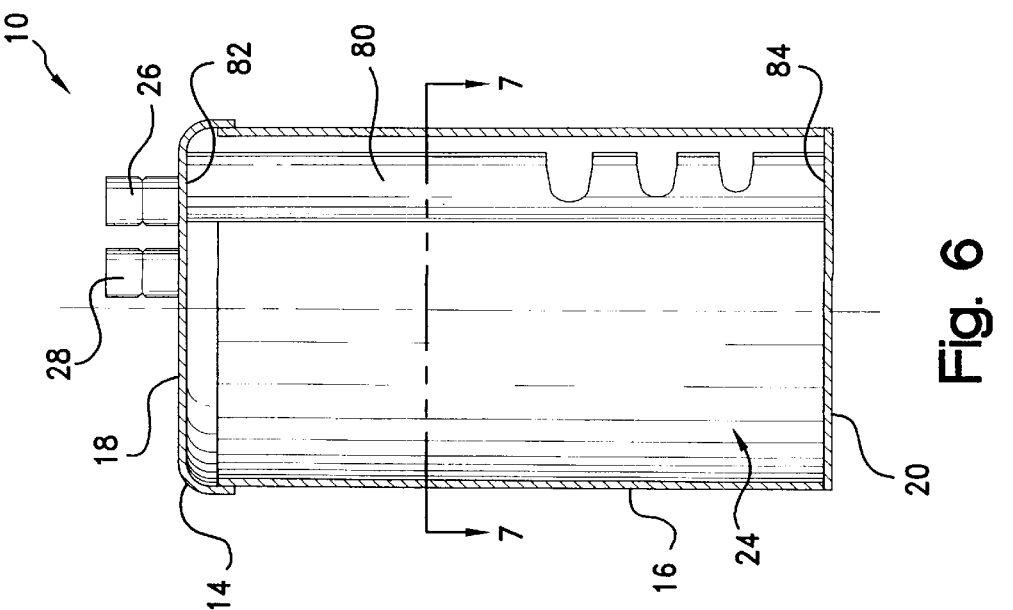
Fig. 6

LIQUID ACCUMULATOR WITH INLET TUBE

RELATED CASES

The present application claims priority to U.S. Provisional Application Ser. No. 60/039,189, filed Feb. 27, 1997.

FIELD OF THE INVENTION

This invention relates generally to refrigeration and air-conditioning systems, and specifically to an improved accumulator for such systems.

BACKGROUND OF THE INVENTION

Conventional refrigeration and air-conditioning systems include a compressor, a condenser, an expansion device, and an evaporator. Refrigerant is circulated through the system to produce cooling. Energy is provided to the system by the compressor which serves to create a source of high pressure gas refrigerant which is allowed to pass through the condenser. The refrigerant dissipates heat in the condenser and changes state to a high pressure liquid. The refrigerant then passes through the expansion device and into the evaporator where the refrigerant changes from a high pressure liquid to a low pressure liquid, and subsequently to a low pressure gas. The change of state removes heat from the area surrounding the evaporator. The refrigerant is then drawn from the evaporator back to the compressor in a low pressure gas form, where it is again compressed into high pressure gas for repetition of the cycle.

An accumulator is normally located between the evaporator and the compressor in the system. The accumulator ensures that only refrigerant in a gas or vapor stage passes into the compressor, as refrigerant from the outlet of the evaporator typically includes both a liquid component and a vapor component. In some accumulators, the vapor component is collected in the upper region of the accumulator, while the liquid component, along with any lubricating oil, drains to the lower region of the accumulator. The vapor component of the refrigerant is removed from the upper region of the accumulator by a U-shaped or J-shaped return conduit. The return conduit typically includes a metering device (e.g., a bleed-through orifice) at the lower portion thereof which draws a small amount of oil (and liquid refrigerant) back into the return tube for lubrication of the downstream components, for example, the compressor.

One drawback associated with some accumulators has been that under certain operating circumstances (such as during start-up), incoming refrigerant enters the accumulator at high velocities and if directed at the stored liquid refrigerant, can disrupt and splash the stored liquid refrigerant. Such splashing can cause uncontrolled return of the refrigerant through the return conduit to the compressor, which is undesirable in certain circumstances.

Some accumulators include a baffle or deflector which is supported within the inlet stream of refrigerant. The deflector or baffle prevents the incoming refrigerant from impacting directly against the stored liquid refrigerant, and instead causes the incoming refrigerant to enter the stored liquid smoothly. The deflector or baffle also facilitates separating the gaseous refrigerant from the liquid refrigerant.

On particularly useful accumulator with a baffle is illustrated in U.S. Pat. Nos. 4,651,540; 5,076,071; and 4,627,247. These patents show a helical baffle disposed at the upper part of the accumulator housing. The helical baffle receives the incoming refrigerant, and directs the refrigerant in a spiralling downward path along the inside surface of the housing. The liquid refrigerant is separated from the gaseous refrigerant by centrifugal force and flows downwardly to join the liquid stored in the lower portion of the housing. The spiralling refrigerant smoothly enters the stored liquid without substantial splashing, and thus without causing uncontrolled return of the liquid refrigerant to the compressor. It is believed that this type of accumulator is also efficient, relatively low-cost to manufacture, and effectively separates gaseous refrigerant from liquid refrigerant.

Nevertheless, it has been found that with this type of accumulator, oil can separate from the stored liquid because the stored liquid is relatively inactive. The oil floats to the top of the stored liquid where it is unavailable to the submerged oil return orifice of the return tube. This can reduce the amount of oil returned to the compressor for lubrication purposes, which can also be undesirable in certain circumstances.

As such, it is believed there is a demand in the industry for a further improved accumulator which allows controlled, agitated introduction of the liquid refrigerant into the stored liquid to prevent or reverse oil separation from the stored liquid, and which prevents uncontrolled liquid return to the compressor. It is also believed that there is a continuous demand in the industry for an efficient and low-cost accumulator which effectively separates gaseous refrigerant from liquid refrigerant.

SUMMARY OF THE INVENTION

The present invention provides an improved accumulator for refrigeration and air-conditioning systems, and in particular provides an improved accumulator having a unique inlet tube structure. The inlet tube structure provides for a controlled agitation of the stored liquid by the entering refrigerant to prevent and reverse oil separation from the liquid, and prevent uncontrolled return of liquid refrigerant to the compressor. In addition, the accumulator is relatively easy and low-cost to manufacture, and effectively separates liquid refrigerant from gaseous refrigerant.

According to one embodiment of the present invention, the inlet tube for the accumulator has a fluid opening which extends longitudinally from a first end of the tube to a second end of the tube. The first end of the inlet tube is fluidly connected to an inlet fitting at an upper end wall of the accumulator housing, while the second end is located proximate the lower end wall of the housing. The opening in the inlet tube extends from a location above the level of stored liquid in the accumulator to a location below the level of stored liquid, and is oriented to direct incoming refrigerant received in the inlet tube in a tangential manner around the inside surface of the accumulator sidewall.

Fluid entering the inlet fitting is directed down through the inlet tube and impinges upon the surface of the stored liquid within the tube. The force of the refrigerant causes the refrigerant to enter the stored liquid, which causes a controlled agitation of the refrigerant within the inlet tube. The agitation causes oil entrained in the stored liquid to remain mixed or to re-mix with the stored liquid, and prevents the oil from separating out and floating to the surface of the liquid.

At the same time, the entering refrigerant is directed through the longitudinal opening in the inlet tube in a spiralling manner against the inside surface of the accumulator sidewall to separate the liquid refrigerant from the gaseous refrigerant. The refrigerant exits the inlet tube primarily above the level of stored liquid, and then flows downwardly along the inside surface of the accumulator sidewall to smoothly enter the liquid. This further enhances the mixing of oil with the stored liquid. The liquid refrigerant settles to the bottom of the accumulator, while the gaseous refrigerant accumulates in the upper portion of the accumulator, and can be returned to the compressor through a return tube.

The mixing of the incoming refrigerant with the stored liquid refrigerant occurs along substantially the entire length of the tube, and as such through substantially the entire depth of the stored liquid. The inlet tube structure automatically compensates for varying levels of stored liquid refrigerant, that is, at low levels, refrigerant primarily exits the inlet tube along the extended available opening above the level of stored liquid, and any splashing is contained within the tube; while at higher liquid levels, refrigerant primarily enters the stored liquid as the available opening above the level of stored liquid is reduced. This maintains mixing of the oil through the depth of the stored liquid.

According to one aspect of this embodiment, the inlet tube comprises a thin, flat metal strip where the side edges of the strip are bent or formed toward each other to define the longitudinal fluid opening along the length of the strip. The longitudinal opening in the tube directs fluid received through the inlet fitting tangentially in a spiralling manner around the inside surface of the sidewall. The upper end of the strip surrounds the opening in the upper end wall for the inlet fitting and is fluidly connected (e.g., brazed or welded) thereto. The lower end of the strip is located near the lower end wall of the accumulator and can be provided with or without an end cap, or can be in contact with and closed by the lower end wall. The inlet tube is assembled with the upper end wall prior to the upper end of the accumulator wall being attached to the cylindrical sidewall.

According to a further aspect of this embodiment, the side edges of the strip can be brought together into contact along a seam, and one or more openings can be formed in the strip to direct the fluid in a tangential manner around the accumulator. Preferably the openings are formed along the seam, and are provided in a spaced-apart manner upwardly from the lower end of the strip.

According to another embodiment of the present invention, the inlet tube can comprise a thin, flat metal strip which cooperates with the inside surface of the sidewall of the accumulator housing to form a fluid path from the inlet fitting to the internal chamber of the accumulator. The strip is bent or formed into a C-shape, and the side edges of the strip are located against the inside surface of the sidewall to prevent fluid flow therebetween. One side edge of the strip can have one or more fluid openings provided in a spaced-apart manner upwardly from the lower end of the strip. Alternatively, one side edge can be spaced from the inside surface of the sidewall to form a longitudinal opening. In either case, the opening(s) direct fluid received through the inlet fitting tangentially in a spiralling manner around the inside surface of the sidewall. The strip also includes a first end fluidly connected (e.g., by brazing or welding) to the inlet fitting at the upper end wall of the housing, and a second end proximate (or in contact with) the lower end wall of the housing.

The accumulator housing for the present invention preferably include an upper end wall, a lower end wall and a cylindrical sidewall interconnecting the upper and lower end walls. The upper and lower end walls are attached to the sidewalls such as by brazing or welding, and together define the internal chamber. The outlet tube preferably has a U-shape, with an outlet end fluidly connected to an outlet fitting on the upper end wall of the accumulator housing, and an inlet end disposed within the internal chamber of the housing. A metering device is provided at the lower end of the U-shaped outlet tube to meter a controlled amount of oil entrained in the stored liquid back to the compressor.

In either of the embodiments described above, the inlet tube allows refrigerant to be introduced into the stored liquid under controlled agitation to prevent and reverse oil separation from the liquid. The agitation is contained substantially within the inlet tube, which prevents splashing and uncontrolled liquid return to the compressor. The inlet tube is relatively easy and low-cost to manufacture and assemble with the accumulator, and by imparting a tangential flow component to the incoming refrigerant to direct the refrigerant in a spiraling manner around the inside surface of the accumulator sidewall, effectively separates liquid refrigerant from the gaseous refrigerant.

Further features and advantages of the present invention will be apparent upon reviewing the following detailed description and accompanying drawings.

BRIEF DESCRIPTION OF THE DRAWINGS

FIG. 3 is a perspective view of the inlet tube of the accumulator of FIG. 1;

FIG. 4 is a top plan view of the inlet tube of FIG. 3;

FIG. 5 is a perspective view similar to FIG. 2, showing a further form of the inlet tube;

FIG. 6 is a cross-sectional side view of an accumulator constructed according to a second embodiment of the present invention, the outlet tube being removed for clarity;

FIG. 7 is a cross-sectional end view of the accumulator taken substantially along the plane described by the lines 7—7 in FIG. 6;

FIG. 8 is a perspective view of certain components of the accumulator of FIG. 6 prior to being assembled within the accumulator housing; and FIG. 9 is a cross-sectional end view of the accumulator similar to FIG. 7, showing a further form of the inlet tube.

DETAILED DESCRIPTION OF THE PREFERRED EMBODIMENT

Figure 2:
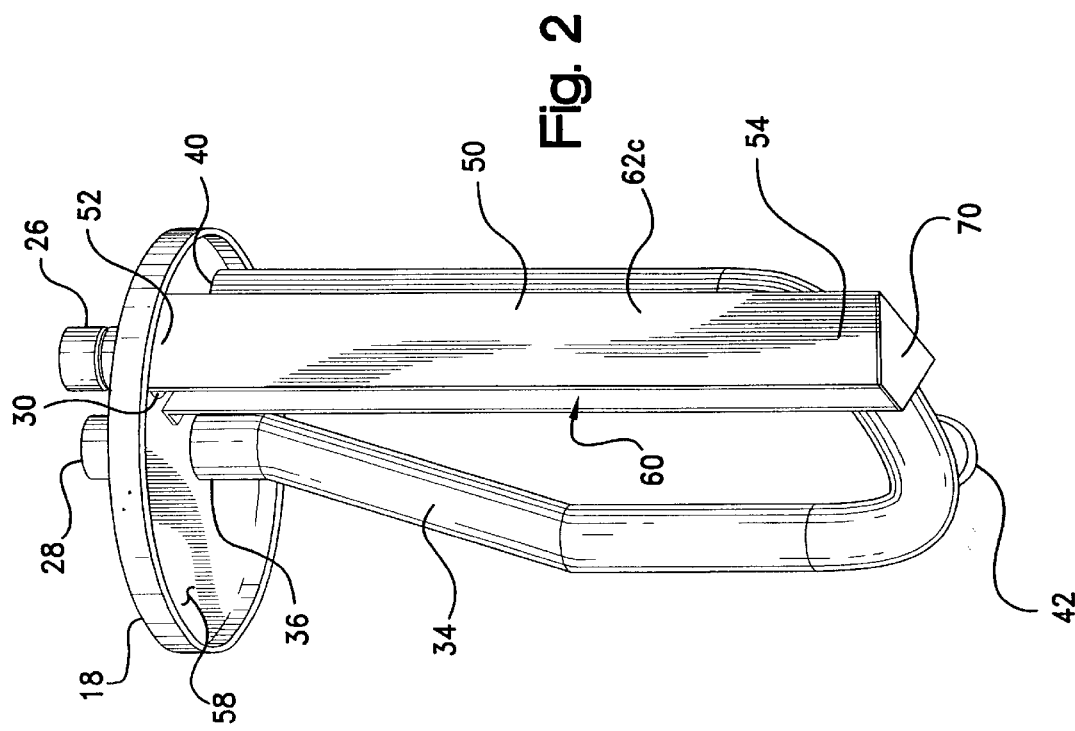
FIG. 2 is a perspective view of certain components of the accumulator of FIG. 1, prior to being assembled within the accumulator housing.
Figure 1:
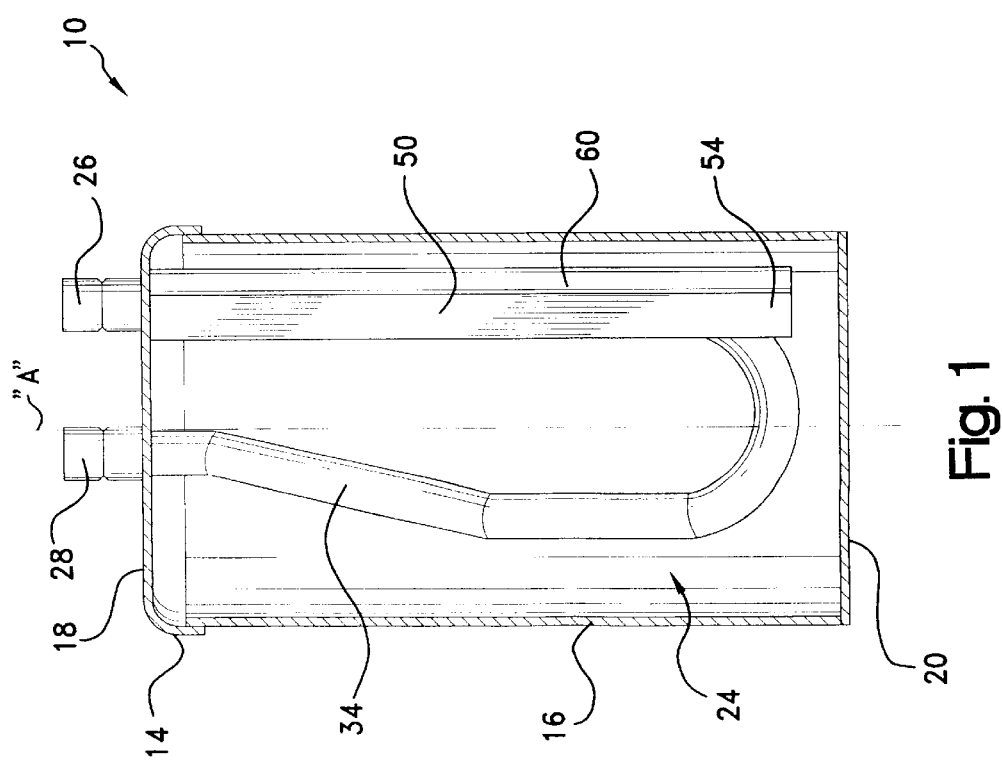
FIG. 1 is a cross-sectional side view of an accumulator constructed according to one embodiment of the present invention.

Referring to the drawings and initially to FIGS. 1 and 2, an accumulator constructed according to the principles of the present invention is illustrated generally at 10. The accumulator includes an outer housing 14 comprising a cylindrical sidewall 16, an upper end wall 18 and a lower end wall 20. Cylindrical sidewall 16 surrounds a central longitudinal axis "A" of the accumulator. Upper end wall 18 and lower end wall 20 are preferably fixidly attached in a fluid-tight manner to cylindrical sidewall 16 using a common technique, such as welding or brazing. The upper end wall 18, lower end wall 20 and cylindrical sidewall 16 define an internal cavity, indicated generally at 24.

The accumulator 10 is designed to be incorporated within refrigeration and air-conditioning systems (together "refrigeration system"), typically between the outlet side of the evaporator and the inlet side of the compressor. As should be known to those skilled in the art, the accumulator is generally designed to store excess liquid in the refrigeration system, and pass vaporous or gaseous refrigerant to the compressor.

To this end, the accumulator includes an inlet fitting 26 and an outlet fitting 28. The inlet and outlet fittings are preferably connected to the upper end wall 18, such as by brazing or welding, and are designed to direct refrigerant into and out of the accumulator 10. The upper end wall 18 includes appropriate openings for the inlet and outlet fittings, one of which is indicated at 30 for inlet fitting 26, such that refrigerant can pass through the upper end wall.

As is also common with accumulators, an outlet tube or return conduit 34, which is preferably in a U-shape, is provided for directing gaseous refrigerant in the accumulator 10 out through outlet fitting 28 to the compressor. Outlet tube 34 includes an outlet end 36 fluidly connected to the outlet fitting 28, and attached thereto using a common technique, such as by brazing, welding or press-fitting end 36 to the upper end wall 18. The outlet tube 34 also includes an inlet end 40 (FIG. 2) which is designed to receive gaseous refrigerant from the internal chamber 24. A metering device 42 is provided at the lower end of the U-shaped outlet tube 34. The metering device can be a bleed orifice or other common device which is designed to meter a controlled amount of oil in the stored refrigerant (as well as a controlled amount of liquid refrigerant) into the outlet tube for return to the compressor. The above-described components for the accumulator are preferably conventional in design and manufacture as should be apparent to those skilled in the art. The components are preferably formed from conventional material (metal) using conventional manufacturing techniques (e.g., stamping, drawing, forming, etc.).

The accumulator 10 further includes an inlet tube 50 designed to receive refrigerant from inlet fitting 26 and direct the refrigerant into the internal chamber 24. According to preferred embodiment of the present invention, inlet tube 50 includes a first end 52 which is fluidly connected to the inlet fitting 26, and a second end 54 which is located proximate the lower end wall 20 of the accumulator housing 16 (see, e.g., FIG. 1).

The first end 52 of the inlet tube 50 is preferably fixed to the inner surface 58 of the upper end wall 18, for example by brazing or welding. It is also anticipated that the inlet tube 50 could extend through the opening 30 in the upper end wall and form the inlet fitting. In this case, the inlet tube could be fixed within the opening in the upper end wall such as by brazing or welding, or even by crimping or swaging the upper end wall around the opening to the inlet tube. In any case, the lower end 54 of the inlet tube 50 is preferably spaced close to the lower end wall 20 of the housing 14, and more preferably within about one-eighth of an inch from the end wall. Alternatively, the inlet tube can also contact this end wall, and be fluidly sealed thereagainst.

The inlet tube 50 has a fluid opening, indicated generally at 60, which extends longitudinally along the inlet tube. Preferably, fluid opening 60 extends the entire length of the tube from the upper end 52 to the lower end 54, although it could also extend along only a portion of the tube depending upon the desired flow characteristics. When the accumulator is incorporated into a refrigeration system, and refrigerant is stored within the accumulator housing 14 during operation, the fluid opening 16 preferably extends from a location above the normal operational level of the stored liquid, to a location below the normal operational level of the stored liquid. The inlet tube 50 is preferably located against or adjacent sidewall 16 and is oriented within the accumulator housing 14 such that the opening 60 directs refrigerant received from the inlet fitting 26 substantially tangentially against the inside surface of the cylindrical sidewall 16 (see, e.g., FIG. 1).

Refrigerant entering inlet fitting 26 passes downwardly through the inlet tube 50 and impinges upon the upper surface of the stored liquid. The velocity of the refrigerant causes the refrigerant to enter the stored liquid within the tube, which causes turbulence and agitation. The turbulence is confined substantially within the inlet tube 50, and little or no splashing or other adverse effects occur in the remainder of the stored liquid that would cause the stored liquid to unintentionally enter the outlet tube 34. The controlled introduction of the refrigerant into the accumulator prevents and reverses oil separation from the stored liquid because of the agitation of the liquid within the inlet tube.

At the same time, the refrigerant exits the inlet tube through the fluid opening 60. The refrigerant is directed in a spiralling manner along the inside surface of the cylindrical sidewall. This action effectively separates liquid refrigerant from gaseous refrigerant in the incoming refrigerant. The spiralling refrigerant exits the inlet tube primarily above the level of the stored liquid, and then flows downwardly along the inside surface of the side wall to smoothly enter the stored liquid, which further facilitates mixing the oil with the stored liquid.

The mixing of the incoming refrigerant with the stored liquid refrigerant occurs along substantially the entire length of the tube, and as such through substantially the entire depth of the stored liquid. The inlet tube structure automatically compensates for varying levels of stored liquid refrigerant, that is, at low levels, refrigerant primarily exits the inlet tube along the extended available opening above the level of stored liquid, and any splashing is contained within the tube; while at higher liquid levels, refrigerant primarily enters the stored liquid as the available opening above the level of stored liquid is also reduced. This maintains mixing of the oil through the depth of the stored liquid.

At high stored liquid levels such as at start-up or defrost, the tangential flow pattern also safely dissipates flow energy, preventing uncontrolled liquid return in the outlet tube. If low flow occurs at low stored liquid levels, such as if a partial loss of refrigerant charge occurs, the inlet tube maintains surface disturbance to promote oil retention within the stored liquid. In any case, the inlet tube structure prevents uncontrolled return of refrigerant to the compressor, and effectively separates liquid refrigerant from gaseous refrigerant in the inlet stream.

According to one aspect of the present invention, the inlet tube 50 is formed from a single strip of material, preferably a flat, rectangular strip of thin metal, which is folded, bent or otherwise formed in the desired shape of the inlet tube. Referring now to FIGS. 3 and 4, the strip is preferably bent to form three walls of the inlet tube 50, designated 62a, 62b and 62c, such that the inlet tube has a triangular configuration in cross-section. Walls 62a–62c can be easily formed by folding the metal strap along longitudinal creases or score lines on the strip using a mandrel or other means. The strip is formed such that the side edge 64a of wall 62a is proximate the side edge 64c of wall 62c, and together define the fluid opening 60. Preferably side edges 64a and 64c are spaced apart the same distance along the entire length of the tube 50, although the side edges could also be tapered to create a tapered fluid opening, if desired. While the distance that side edges 64a and 64c are separated can vary depending upon the anticipated fluid flow through the inlet tube, it is preferred that the maximum distance is about two-thirds the diameter of the opening 30 to the inlet tube, for example for an inlet opening of one-half inch, the longitudinal fluid opening would be at a maximum about one-third inch wide. It is believed that this provides satisfactory introduction of incoming fluid into stored liquid along the entire length of the tube and throughout typical operating conditions.

The upper end 52 of the inlet tube 50 can have a series of flanges 66a–66c associated with each of the wall 62a–62c, and each of which is bent outwardly from a respective wall. Flanges 66a–66c facilitate the attachment of the inlet tube 50 to the upper end wall 18 of the accumulator housing 14. Each of the flanges 66a–66b are located in surface-to-surface contact with the inside surface 58 of the upper end wall 18, and fixed thereto such as by brazing or welding. The flanges 66a–66c are located against the inside surface 58 such that the walls 62a–62c surround the opening 30 in the upper end wall 18.

The lower end 54 of the inlet tube 50 preferably includes an end cap 70 which defines the lower end of the tube. End cap 70 is preferably formed in one piece with the inlet tube 50, such as by folding or bending a portion of the strip forming the inlet tube and associated with wall 62b, against the lower edge of walls 62a and 62c. The end cap 70 can also be formed separately from the inlet tube and attached thereto such as by brazing or welding. End cap 70 preferably extends substantially perpendicular to walls 62a–62c, by cutting and shaping the walls 62a–62c as appropriate. The entire forming operation of the inlet tube 50 is simple and uses common techniques and tools which should be well-known to those skilled in the art.

As indicated above, the lower end cap 70 of the inlet tube is preferably located proximate to the lower end wall 20 of the accumulator housing. The lower end cap 70 can also be located in contact with the lower end wall. In this case, the lower end cap 70 can be removed, and the walls 62a–62c of the inlet tube can extend entirely to the lower end wall 20 of the accumulator housing in fluid-tight contact therewith, such that the lower end wall 20 of the accumulator housing essentially functions as the lower end cap of the inlet tube.

In any case, the walls 62a–62c of the inlet tube 50 preferably extend parallel to the longitudinal axis A of the housing, with one of the walls, for example, wall 62c, being disposed adjacent, or even in contact with the inside surface of the cylindrical sidewall 16. In such a manner, the fluid opening 60 directs fluid substantially tangential to the inside surface of the sidewall. The inlet tube 50 and outlet tube 34 are preferably pre-assembled with upper end wall 18 prior to the end wall being fixed to the sidewall 16. This facilitates the easy assembly of the inlet and outlet tubes to the upper end wall.

According to a preferred aspect of this embodiment illustrated in FIG. 5, the inlet tube 50 can be formed such that the side edges 64a, 64c meet and contact each other along a portion or the entire length of the inlet tube 50. In this aspect, the inlet tube can be formed so as to create four walls, 71a–71d, such that the inlet tube has a square configuration in cross-section. One or more fluid openings, indicated at 72a–72d, can be formed along the length of the inlet tube, preferably extending upwardly from the lower end 54 of the tube. The openings 72a–72d can be formed in any of the walls, and as illustrated, a portion of each opening is formed in each edge 64a, 64c along seam 74 between the edges. The openings can be created (punched, etc.) in the strip after the strip is formed in the desired shape, or alternatively can be pre-formed in the strip. In any case, the openings are oriented to direct the fluid in a tangential manner around the inside surface of the cylindrical sidewall 16. The number, dimension and location of the openings is dependent upon the desired flow characteristics for the refrigerant, and can be easily determined by those skilled in the art. The lower end 54 of the inlet tube 50 could also have an end cap as described above, or can be entirely open and contact the lower end wall 20 of the accumulator. Alternatively, the lower end can be partially closed, and have an opening 75 formed therein to permit controlled fluid flow through the bottom end of the inlet tube. In this case, the lower end 54 of the inlet tube would be spaced-apart from the lower end wall 20 of the accumulator housing 14.

According to a second embodiment of the present invention illustrated in FIGS. 6–9, an inlet tube 80 is shown which cooperates with the cylindrical sidewall 16 of the accumulator 10 to direct fluid received in inlet fitting 26 into the internal cavity 24 of the accumulator housing. Inlet tube 80 includes a first end 82 which surrounds at least a portion of the inlet opening 30 (FIG. 2) and is attached to the upper end wall 18, such as by brazing or welding. The inlet tube also includes a second end 84 spaced proximate, and preferably against, the lower end wall 20 of the housing 14.

Inlet tube 80 preferably comprises a strip of material, for example a flat, rectangular strip of thin metal, having a first side edge 86a and a second side edge 86b. The strip is bent or otherwise formed such that side edge 86a is brought toward side edge 86b in a "C"-shaped configuration. As shown in FIGS. 6–8, side edges 86a and 86b can be located against the inside surface of the cylindrical sidewall 16 to prevent fluid flow therebetween. Side edge 86b includes at least one, and preferably a series of fluid openings, for example, as indicated at 88a–88c, which direct fluid received from the inlet fitting in a tangential manner along the inside surface of the sidewall. The fluid openings 88a–88c are preferably provided in a spaced-apart manner upwardly from the lower wall of the housing. While openings 88a–88c are shown extending along the edge 86b of the inlet tube and forming with the sidewalls individual fluid paths, the openings 88a–88c can be formed entirely within the strip of material, as long as the openings direct the fluid tangentially along the inside surface of the cylindrical sidewall. The number, location and spacing of the inlet openings can be determined depending upon the particular fluid flow characteristics desired, as should be apparent to those skilled in the art.

In this second embodiment (as in the first embodiment), the inlet tube preferably is pre-assembled with the upper end wall 18 of the accumulator with the upper end 82 initially attached to the upper end wall of the accumulator. This sub-assembly is then located within the accumulator housing, and the upper end wall can be attached to the sidewall 16 such as by brazing or welding. It is also anticipated that the inlet tube in this embodiment could be pre-assembled with the cylindrical sidewall and fixedly attached thereto, such as by brazing or welding, prior to the upper end wall 18 being fixed to the accumulator housing. In this case, the upper end 82 of the inlet tube is preferably positioned to surround the inlet opening 30 in the upper end wall when the end wall is attached to the accumulator sidewall. In either case, an end cap can also be provided at the lower end 84 of the inlet tube in the same manner as described above with respect to the first embodiment, or a fixed opening in the end cap could be provided.

Moreover, while it is illustrated that the strip forming the inlet tube is smoothly curved, it is also possible that the strip could have score lines or creases and have defined longitudinally-extending sidewalls such as described in the first embodiment. While not shown in FIG. 8, an outlet tube (similar to outlet tube 34 in FIG. 1) is provided which returns gaseous refrigerant through outlet fitting 28.

According to a still further aspect of this embodiment illustrated in FIG. 9, one of the side edges, for example side edge 86b, can be located in a spaced-apart manner from the inside surface of cylindrical sidewall 16 along the entire length (or a portion of the length) of the inlet tube 80. A longitudinally-extending fluid opening 90 is defined along the length of the inlet tube 80, similar to the fluid opening 60 discussed above with respect to FIG. 2. Opening 90 is oriented to direct fluid received from inlet fitting 26 tangentially along the inside surface of the housing. Again, it is preferred that the longitudinal opening 90 extend along the entire length of the tube, although it could extend along only a portion of the tube, if desired. The plurality of openings 88–88c would not be necessary in this further aspect.

According to still further aspects, the inlet tube can have cross-sectional configurations other than that as described above, for example in the first embodiment the inlet tube could have a C-shaped configuration, with the side edges defining the longitudinal opening. This configuration of tube (in cross-section) could be created by forming a thin flat strip of metal into a C-shape configuration around a round mandrel, or alternatively by cutting a longitudinal opening in a cylindrical tube. Other configurations are of course possible, as long as the configuration is commercially-practical to manufacture and directs the fluid tangentially along the inside surface of the sidewall.

In any of the embodiments and aspects described above, the inlet tube allows refrigerant to be introduced into the stored liquid in the accumulator in a controlled manner, and with controlled agitation to prevent and reverse oil separation from the liquid. Because the turbulence is limited primarily to the area defined within the inlet tube, the incoming refrigerant does not splash or otherwise cause an uncontrolled entry of refrigerant into the outlet or return tube. The inlet tube is relatively easy and low-cost to manufacture and assemble with the accumulator, and by imparting a tangential flow component to the incoming refrigerant to direct the refrigerant in a spiralling manner around the inside surface of the accumulator, effectively separates liquid refrigerant from gaseous refrigerant so that the gaseous refrigerant can be returned to the compressor.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An accumulator for a refrigeration system wherein refrigerant can be circulated, said accumulator comprising:
   a housing having a cylindrical sidewall defining a longitudinal axis of the housing, and upper and lower end walls at either end of the sidewall, which together with the sidewall, define an internal chamber,
   inlet and outlet fittings on said housing for providing inlet and outlet passages to the internal chamber to direct the refrigerant into and out of the accumulator, said inlet fitting being associated with the upper end wall of the housing,
   an outlet tube disposed in the internal chamber having a first end fluidly connected to said outlet fitting, and a second end for receiving refrigerant from the internal chamber, the outlet tube including an oil return metering device,
   an inlet tube also disposed- in the internal chamber having a first end fluidly connected to said inlet fitting, and a second end spaced proximate to the lower end wall of the housing, said inlet tube extending through the internal chamber adjacent to an inside surface of the sidewall of the housing, said inlet tube having a longitudinal fluid opening along an extent of the inlet tube from the first end toward the second end of the inlet tube, the inlet tube being oriented such that the fluid opening directs refrigerant received in said inlet tube around the inside surface of the sidewall substantially in a direction tangential to the sidewall.

2. The accumulator as in claim 1, wherein both said inlet and outlet fittings are connected to said upper end cap.

3. The accumulator as in claim 1, wherein said inlet tube and said sidewall cooperate to define a flow path from said inlet fitting to said second end of the inlet tube.

4. The accumulator as in claim 1, wherein the oil return metering device is located between the first and second ends of the outlet tube.

5. The accumulator as in claim 1, wherein the inlet tube extends parallel to the longitudinal axis of the sidewall, and extends substantially the entire longitudinal extent of the housing.

6. An accumulator for a refrigeration system wherein refrigerant can be circulated, said accumulator comprising:
   a housing having a cylindrical sidewall defining a longitudinal axis of the housing, and upper and lower end walls at either end of the sidewall, which together with the sidewall, define an internal chamber,
   inlet and outlet fittings on said housing for providing inlet and outlet passages to the internal chamber to direct the refrigerant into and out of the accumulator, said inlet fitting being associated with the upper end wall of the housing,
   an outlet tube disposed in the internal chamber having a first end fluidly connected to said outlet fitting, and a second end for receiving refrigerant from the internal chamber,
   an inlet tube also disposed in the internal chamber having a first end fluidly connected to said inlet fitting, and a second end spaced proximate to the lower end wall of the housing, said inlet tube extending through the internal chamber adjacent to an inside surface of the sidewall of the housing, said inlet tube having a longitudinal fluid opening along an extent of the inlet tube from the first end toward the second end of the inlet tube, the inlet tube being oriented such that the fluid opening directs refrigerant received in said inlet tube around the inside surface of the sidewall substantially in a direction tangential to the sidewall, wherein said inlet tube is formed from a strip of material extending parallel to the longitudinal axis of the sidewall, a first end of the strip being fluidly connected to said inlet fitting, a second end of the strip defining the second end of the inlet tube, and the side edges of the strip being adjacent one another along the entire length of the strip to define the longitudinal fluid opening along the tube.

7. The accumulator as in claim 6, wherein said inlet fitting defines an inlet opening in said upper end wall, and said first end of said inlet tube surrounds said inlet opening in said upper end wall.

8. The accumulator as in claim 7, wherein said first end of said inlet tube is fixedly secured to said upper end cap.

9. The accumulator as in claim 6, wherein said longitudinal fluid opening extends along the entire length of the tube.

10. The accumulator as in claim 6, wherein the second end of the inlet tube is closed by an end cap.

11. The accumulator as in claim 10, wherein said end cap is formed in one piece with the strip of material.

12. An accumulator for a refrigeration system wherein refrigerant can be circulated, said accumulator comprising:
a housing having a cylindrical sidewall defining a longitudinal axis of the housing, and upper and lower end walls at either end of the sidewall, which together with the sidewall, define an internal chamber,
inlet and outlet fittings on said housing for providing inlet and outlet passages to the internal chamber to direct the refrigerant into and out of the accumulator, said inlet fitting being associated with the upper end wall of the housing,
an outlet tube disposed in the internal chamber having a first end fluidly connected to said outlet fitting, and a second end for receiving refrigerant from the internal chamber,
an inlet tube also disposed in the internal chamber having a first end fluidly connected to said inlet fitting, and a second end spaced proximate to the lower end wall of the housing, said inlet tube extending through the internal chamber adjacent to an inside surface of the sidewall of the housing, said inlet tube having a longitudinal fluid opening along an extent of the inlet tube from the first end toward the second end of the inlet tube, the inlet tube being oriented such that the fluid opening directs refrigerant received in said inlet tube around the inside surface of the sidewall substantially in a direction tangential to the sidewall, wherein the inlet tube has a fluid opening extending along the entire length of the inlet tube from the first end to the second end.

13. An accumulator for a refrigeration system wherein refrigerant enters the accumulator as a liquid and gas mixture with an oil component and whereby liquid refrigerant and the oil component is stored in the accumulator and settles to the bottom portion of the accumulator and gaseous refrigerant is contained and can be withdrawn from the upper portion of the accumulator, said accumulator comprising:
a housing having a cylindrical sidewall defining a longitudinal axis of the housing and upper and lower annular end walls which together with the sidewall, define an internal chamber for the refrigerant,
inlet and outlet fittings on said housing for providing inlet and outlet passages to the internal chamber to direct the liquid and gaseous mixture of refrigerant into the housing and the gaseous refrigerant out of the housing, said inlet fitting being connected to said upper end wall and extending outwardly away therefrom,
an outlet tube disposed in the internal chamber having a first end fluidly connected to said outlet fitting, and a second end for receiving gaseous refrigerant from the internal chamber, the outlet tube including an oil return metering device to meter liquid refrigerant and the oil component into the outlet tube,
an inlet tube also disposed in the internal chamber having a first end fluidly connected to said inlet fitting, and a second end spaced proximate the lower end wall, said inlet tube extending through the internal chamber adjacent an inside surface of the sidewall, said inlet tube being closed at the second end, and having a fluid opening along an extent of the inlet tube from a location proximate the upper end wall and above the stored level of liquid refrigerant in the accumulator to a location proximate the lower end wall and below the stored level of liquid refrigerant in the accumulator, the inlet tube being oriented such that the fluid opening directs the liquid and gaseous refrigerant received in said inlet tube substantially in a direction tangential to the inside surface of the sidewall to separate the gaseous refrigerant from the liquid refrigerant, and prevent the liquid refrigerant and oil component from separating.

14. An accumulator for a refrigeration system wherein refrigerant is circulated, said accumulator comprising:
a housing having a cylindrical sidewall defining a longitudinal axis of the housing, and first and second end walls at either end of the sidewall, which together with the sidewall, define an internal chamber,
inlet and outlet fittings on said housing for providing inlet and outlet passages to the internal chamber to direct the refrigerant into and out of the housing, said inlet fitting being associated with one of said end walls,
an outlet tube disposed in the internal chamber having a first end fluidly connected to said outlet fitting, and a second end for receiving refrigerant from the internal chamber,
an inlet tube also disposed in the internal chamber having a first end fluidly connected to said inlet fitting, and a second end spaced proximate to another of said end walls of the housing, said inlet tube comprising a strip of material extending adjacent an inside surface of the sidewall, one end of the strip being fluidly connected to the inlet fitting, a second end of the strip defining the second end of the inlet tube, and the side edges of the strip being adjacent one another to define a fluid opening along the inlet tube, the side edges being oriented to direct refrigerant received in said inlet tube through the fluid opening substantially in a direction tangential to the inside surface of the sidewall.

15. The accumulator as in claim 14, wherein said side edges of said strip extend adjacent one another in a spaced-apart manner along the entire length of the strip to define a longitudinal opening extending along the entire length of strip.

16. The accumulator as in claim 14, wherein said inlet fitting defines an inlet opening in said one end wall, and said first end of said inlet tube surrounds said inlet opening in said one end wall.

17. The accumulator as in claim 16, wherein said first end of said inlet tube is fixedly secured to said one end wall.

18. The accumulator as in claim 14, wherein the second end of the inlet tube is closed by an end cap.

19. The accumulator as in claim 18, wherein said end cap is formed in one piece with the strip of material.

20. The accumulator as in claim 14, wherein the inlet tube extends parallel to the longitudinal axis of the housing, and extends substantially the entire longitudinal extent of the housing.

21. The accumulator as in claim 14, wherein both said inlet and outlet fittings are connected to said one end wall.

22. An accumulator for a refrigeration system wherein refrigerant is circulated, said accumulator comprising:
a housing having a cylindrical sidewall defining a longitudinal axis of the housing, and first and second end walls at either end of the sidewall, which together with the sidewall, define an internal chamber, inlet and outlet fittings on said housing for providing inlet and outlet passages to the internal chamber to direct the refrigerant into and out of the housing, said inlet fitting being associated with one of said end walls, an outlet tube disposed in the internal chamber having a first end fluidly connected to said outlet fitting, and a second end for receiving refrigerant from the internal chamber, an inlet tube also disposed in the internal chamber having a first end fluidly connected to said inlet fitting, and a second end spaced proximate to another of the end walls of the housing, said inlet tube comprising a strip of material extending adjacent an inside surface of the sidewall and cooperating with the sidewall to define a flow path from the inlet fitting to the second end of the inlet tube, a first end of the strip being fluidly connected to the inlet fitting, a second end of the strip defining the second end of the inlet tube, one side edge of the strip being located against the inside surface of the cylinder to prevent fluid flow therebetween, and another side edge of the strip including a fluid opening, said strip being oriented to direct refrigerant received in said inlet tube through the fluid opening substantially in a direction tangential to the inside surface of the sidewall.

23. The accumulator as in claim 22, wherein said other side edge of the strip is spaced apart from the sidewall, and the fluid opening is provided between the other side edge and the sidewall.

24. The accumulator as in claim 22, wherein said inlet fitting defines an inlet opening in said one end wall, and said first end of said inlet tube surrounds said inlet opening in said one end wall.

25. The accumulator as in claim 24, wherein said first end of said inlet tube is fixedly secured to said one end wall.

26. The accumulator as in claim 22, wherein the inlet tube extends parallel to the longitudinal axis of the housing, and extends substantially the entire longitudinal extent of the housing.

27. The accumulator as in claim 22, wherein both said inlet and outlet fittings are connected to said one end wall.

28. The accumulator as in claim 22, wherein the second end of the inlet tube is closed by an end cap.

29. The accumulator as in claim 28, wherein said end cap is formed in one piece with the strip of material.

30. A method for storing excess refrigerant in an accumulator of a refrigerant system, and for separating gaseous refrigerant from a liquid and gaseous refrigerant mixture, wherein the refrigerant mixture includes an oil component, comprising the steps of:

providing an accumulator having:

a housing with a cylindrical sidewall defining a longitudinal axis of the housing, and upper and lower end walls at either end of the sidewall, which together with the sidewall, define an internal chamber for storing liquid refrigerant, inlet and outlet fittings on said housing for providing inlet and outlet passages to the internal chamber to direct the refrigerant into and out of the accumulator, an outlet tube disposed in the internal chamber having a first end fluidly connected to said outlet fitting, and a second end for receiving refrigerant from the internal chamber, the outlet tube further including an oil metering device for drawing off the oil component in the mixture, and an inlet tube also disposed in the internal chamber having a first end fluidly connected to said inlet fitting, and a second end spaced proximate to the lower end wall of the housing, said inlet tube extending through the internal chamber adjacent to an inside surface of the sidewall of the housing, said inlet tube having a longitudinal fluid opening along an extent of the inlet tube from the first end toward the second end of the inlet tube, the inlet tube being oriented such that the fluid opening directs refrigerant received in said inlet tube around the inside surface of the sidewall substantially in a direction tangential to the sidewall, directing the refrigerant mixture into the accumulator through the inlet fitting and directing the mixture through the inlet tube into the stored liquid refrigerant, the mixture impinging upon any stored liquid refrigerant in the inlet tube and entering the stored liquid refrigerant in the inlet tube and concurrently mixing the oil component with the stored liquid refrigerant to prevent separation of the oil component from the stored liquid refrigerant, and directing the mixture through the fluid opening along the inside surface of the sidewall substantially in a direction tangential to the sidewall, wherein the mixture separates into its liquid and gaseous components, and drawing off the oil component and liquid refrigerant through the metering device in the outlet tube.

31. An accumulator for a refrigeration system wherein refrigerant enters the accumulator as a liquid and gas mixture and whereby liquid refrigerant is stored in the accumulator and settles to the bottom portion of the accumulator and gaseous refrigerant is contained and can be withdrawn from the upper portion of the accumulator, said accumulator comprising:

a housing having a cylindrical sidewall defining a longitudinal axis of the housing and upper and lower annular end walls which together with the sidewall, define an internal chamber for the refrigerant, inlet and outlet fittings on said housing for providing inlet and outlet passages to the internal chamber to direct the liquid and gaseous mixture of refrigerant into the housing and the gaseous refrigerant out of the housing, said inlet fitting being connected to said upper end wall and extending outwardly away therefrom, an outlet tube disposed in the internal chamber having a first end fluidly connected to said outlet fitting, and a second end for receiving gaseous refrigerant from the internal chamber, an inlet tube also disposed in the internal chamber having a first end fluidly connected to said inlet fitting, and a second end spaced proximate the lower end wall, said inlet tube extending through the internal chamber adjacent an inside surface of the sidewall, said inlet tube being closed at the second end, and having a fluid opening along an extent of the inlet tube from a location proximate the upper end wall and above the stored level of liquid refrigerant in the accumulator to a location proximate the lower end wall and below the stored level of liquid refrigerant in the accumulator, the inlet tube being oriented such that the fluid opening directs the liquid and gaseous refrigerant received in said inlet tube substantially in a direction tangential to the inside surface of the sidewall to separate the gaseous refrigerant from the liquid refrigerant, wherein said inlet tube comprises a strip of material extending parallel to the longitudinal axis of the sidewall, with an upper end of the strip fluidly connected to said inlet fitting, a lower end of the strip defining the second end of the inlet tube, and the side edges of the strip being adjacent one another to define the fluid opening along the inlet tube.

32. The accumulator as in claim 31, wherein the side edges of the strip extend adjacent one another in a spaced-apart manner to define a longitudinal opening along the entire length of the strip.

33. An accumulator for a refrigeration system wherein refrigerant enters the accumulator as a liquid and gas mixture and whereby liquid refrigerant is stored in the accumulator and settles to the bottom portion of the accumulator and gaseous refrigerant is contained and can be withdrawn from the upper portion of the accumulator, said accumulator comprising:

a housing having a cylindrical sidewall defining a longitudinal axis of the housing and upper and lower annular end walls which together with the sidewall, define an internal chamber for the refrigerant, inlet and outlet fittings on said housing for providing inlet and outlet passages to the internal chamber to direct the liquid and gaseous mixture of refrigerant into the housing and the gaseous refrigerant out of the housing, said inlet fitting being connected to said upper end wall and extending outwardly away therefrom, an outlet tube disposed in the internal chamber having a first end fluidly connected to said outlet fitting, and a second end for receiving gaseous refrigerant from the internal chamber, an inlet tube also disposed in the internal chamber having a first end fluidly connected to said inlet fitting, and a second end spaced proximate the lower end wall, said inlet tube extending through the internal chamber adjacent an inside surface of the sidewall, said inlet tube being closed at the second end, and having a fluid opening along an extent of the inlet tube from a location proximate the upper end wall and above the stored level of liquid refrigerant in the accumulator to a location proximate the lower end wall and below the stored level of liquid refrigerant in the accumulator, the inlet tube being oriented such that the fluid opening directs the liquid and gaseous refrigerant received in said inlet tube substantially in a direction tangential to the inside surface of the sidewall to separate the gaseous refrigerant from the liquid refrigerant, wherein said inlet tube comprises a strip of material extending parallel to the longitudinal axis of the sidewall and cooperating with the sidewall to define a flow path from the inlet fitting to the second end of the inlet tube, with an upper end of the strip fluidly connected to said inlet fitting, a lower end of the strip defining the second end of the inlet tube, one side edge of the strip being located against the inside surface of the cylinder to prevent fluid flow therebetween, and another side edge of the strip including the fluid opening.

34. The accumulator as in claim 33, wherein said other side edge of the strip is spaced apart from the sidewall, and the fluid opening is defined between the other side edge and the sidewall.

35. An accumulator for a refrigeration system wherein refrigerant can be circulated, said accumulator comprising:

a housing having a cylindrical sidewall defining a longitudinal axis of the housing, and upper and lower end walls at either end of the sidewall, which together with the sidewall, define an internal chamber, inlet and outlet fittings on said housing for providing inlet and outlet passages to the internal chamber to direct the refrigerant into and out of the accumulator, said inlet fitting being associated with the upper end wall of the housing, an outlet tube disposed in the internal chamber having a first end fluidly connected to said outlet fitting, and a second end for receiving refrigerant from the internal chamber, an inlet tube also disposed in the internal chamber having a first end fluidly connected to said inlet fitting, and a second end spaced proximate to the lower end wall of the housing, said inlet tube extending through the internal chamber adjacent to an inside surface of the sidewall of the housing, said inlet tube having a longitudinal fluid opening along an extent of the inlet tube from the first end toward the second end of the inlet tube, the inlet tube being oriented such that the fluid opening directs refrigerant received in said inlet tube around the inside surface of the sidewall substantially in a direction tangential to the sidewall, wherein said inlet tube and said sidewall cooperate to define a flow path from said inlet fitting to said second end of the inlet tube and wherein said inlet tube comprises a strip of material extending parallel to the longitudinal axis of the sidewall, with a first end of the strip fluidly connected to said inlet fitting, a second end of the strip defining the second end of the inlet tube, one side edge of the strip being located against the inside surface of the sidewall to prevent fluid flow therebetween, and another side edge of the strip including the longitudinal fluid opening.

36. The accumulator as in claim 35, wherein said other side edge of the strip is spaced apart from the sidewall, and the longitudinal fluid opening is defined between the other side edge and the sidewall.

* * * * *